United States Patent [19]

Kotthaus

[11] Patent Number: 4,627,770
[45] Date of Patent: Dec. 9, 1986

[54] GEAR CUTTER

[75] Inventor: Erich Kotthaus, Wallisellen, Switzerland

[73] Assignee: Werkzeugmaschinenfabrik Oerlikon-Bührle AG, Zürich, Switzerland

[21] Appl. No.: 470,485

[22] Filed: Feb. 28, 1983

[30] Foreign Application Priority Data

Mar. 16, 1982 [CH] Switzerland ............... 1626/82

[51] Int. Cl.⁴ .................................... B26D 1/12
[52] U.S. Cl. ............................... 407/21; 407/22
[58] Field of Search ............... 407/22, 21, 20, 28, 407/29; 409/20, 26, 21, 22, 28, 29, 52, 53

[56] References Cited

U.S. PATENT DOCUMENTS

| Re. 22,891 | 6/1947 | Head | 407/22 |
| 1,876,167 | 5/1932 | Redner | 407/21 |
| 1,969,843 | 8/1934 | Head | 407/21 X |
| 2,135,893 | 11/1938 | Head | 407/22 |
| 2,274,761 | 3/1942 | Wildhaber | 407/21 |
| 2,346,807 | 4/1944 | Wildhaber | 409/26 |
| 2,353,768 | 7/1944 | Shlesinger | 407/22 |
| 2,497,923 | 2/1950 | Bazarnie | 409/21 |
| 2,932,239 | 4/1960 | Wildhaber | 407/21 |
| 4,060,881 | 12/1977 | Ryan et al. | 407/22 |

FOREIGN PATENT DOCUMENTS 755571 5/1943 Fed. Rep. of Germany ........ 407/22

Primary Examiner—William R. Briggs
Attorney, Agent, or Firm—Werner W. Kleeman

[57] ABSTRACT

To provide better possibilities for shaping or forming the tooth bearing pattern or localized tooth contact the cutting edges, i.e. the outer and the inner cutting edges, of the cutters are inserted into the face cutter head such that an end of the cutting edge which faces the base of the tooth leads the other end of the same cutting edge.

6 Claims, 7 Drawing Figures

GEAR CUTTER

BACKGROUND OF THE INVENTION

The present invention relates to a new and improved method of configuring, shaping or forming the tooth bearing pattern or localized tooth contact of gears containing teeth of a cycloidally arcuate shape as well as a face cutter head for performing the method.

With respect to the method of the present development, such in its more particular aspects is of the type comprising the steps of cutting tooth gaps or spaces by using a rotating face cutter head or face-mill gear cutter having a rotational axis about which the face cutter head rotates, and provided with cutters or cutter blades which have inner and outer cutting edges for machining the outer and inner tooth flanks of the gear teeth.

With respect to the apparatus of the present development, such in its more particular aspects concerns an improved face cutter head or face-mill gear cutter useful for carrying out the method as mentioned hereinbefore.

A method of and a cutter head pair for lengthwise crowning of the longitudinally curved gear teeth of a pair of bevel gears or hypoid gears is known, for example, from Swiss Pat. No. 417,284. The crowning of the teeth is achieved by inclining the cutter head rotational axis in a radial plane extending through a selected computation point of a tooth flank. Since the cutter head rotational axis no longer extends perpendicularly with respect to the crown gear plane, the end regions of the tooth gaps or spaces are cut somewhat deeper into the gear blank. However, since the cutting edges of the cutters in the cutter head are inclined at a pressure angle with respect to a line extending perpendicular to the plane of the crown gear, the longitudinal lines of the gear teeth will deviate from the cycloid shape at the end regions of the tooth gaps or spaces. When two tooth flanks thus produced mesh, they only will contact at the central region of the teeth.

In practical operation during which the teeth are loaded and have to transfer torque or rotational moment, the conditions at the region of contact between two corresponding tooth flanks will change. This is so because the shafts upon which the gears are mounted and the housing at which the shafts are journalled deform under the load to be transferred. Additionally, the teeth of the gears, also, will deform under load. It will thus be readily seen that the conditions of contact between two tooth flanks or the tooth bearing pattern or localized tooth contact may appreciably change under load.

Using the known method the tooth bearing pattern may be kept under control by suitable choice of the crowning as long as the orientation angle of the cutters, i.e. the angle through which the cutters are rotated with respect to a corresponding cutter radius, assume modest values.

The selection of larger orientation angles is limited in the prior art method by the change in the tooth bearing thus effected.

SUMMARY OF THE INVENTION

Therefore, with the foregoing in mind it is a primary object of the present invention to provide an improved method of, and apparatus for, configuring or forming the tooth bearing pattern of gears having teeth of a cycloidally arcuate shape, which offers better possibilities for configuring or forming the tooth bearing pattern or localized tooth contact of two tooth flanks.

Now in order to implement this object and still further objects of the invention, which will become more readily apparent as the description proceeds, the method of configuring or forming the tooth bearing pattern of gears of the present development is manifested by the features that, the cutting edges—inner and outer cutting edges—of the cutters or cutter blades are arranged such that an end facing the base of the tooth space leads the other end of the same cutting edge as seen in the cutting direction. The face cutter head of the present development for configuring or forming the tooth bearing pattern of gears having teeth of a cycloidal arcuate shape is manifested by the features that, cutters or cutter blades are arranged in the face cutter head. Each of the cutters have an inner cutting edge and an outer cutting edge. There is also defined a cutter radius and an orientation line. The orientation line and the cutter radius define a plane which is parallel to an end face of said face cutter head. A normal plane extends perpendicular relative to said orientation line, and said orientation line intersects said cutter radius in the normal plane and is inclined towards said cutter radius by an orientation angle. A projection of at least one of said cutting edges on said normal plane appears inclined by an undercut angle towards a line extending normally with respect to said plane which is parallel to said end face, such that an end of said cutting edge remote from said end face leads, as viewed in the direction of movement of said end cutter head.

The advantages achieved by the invention are seen in now enabling a selection of larger orientation angles without further disadvantages. Consequently, more efficient cutter heads, i.e. cutter heads comprising a larger number of groups of cutters cutter blades, can be used. As a result, there is possible an increase in the cutting efficiency and a reduction of the machining times for the gears. A further advantage resides in the improvement in the dislocation characteristics or properties of the gears thus produced. In such gears the tooth bearing patterns or localized tooth contacts change less markedly due to deformation under load as well as due to inaccuracies in the gear assembly. Also, in this way changes in the gear shape due to distortions during hardening in the case of hardened gears can be balanced or compensated.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
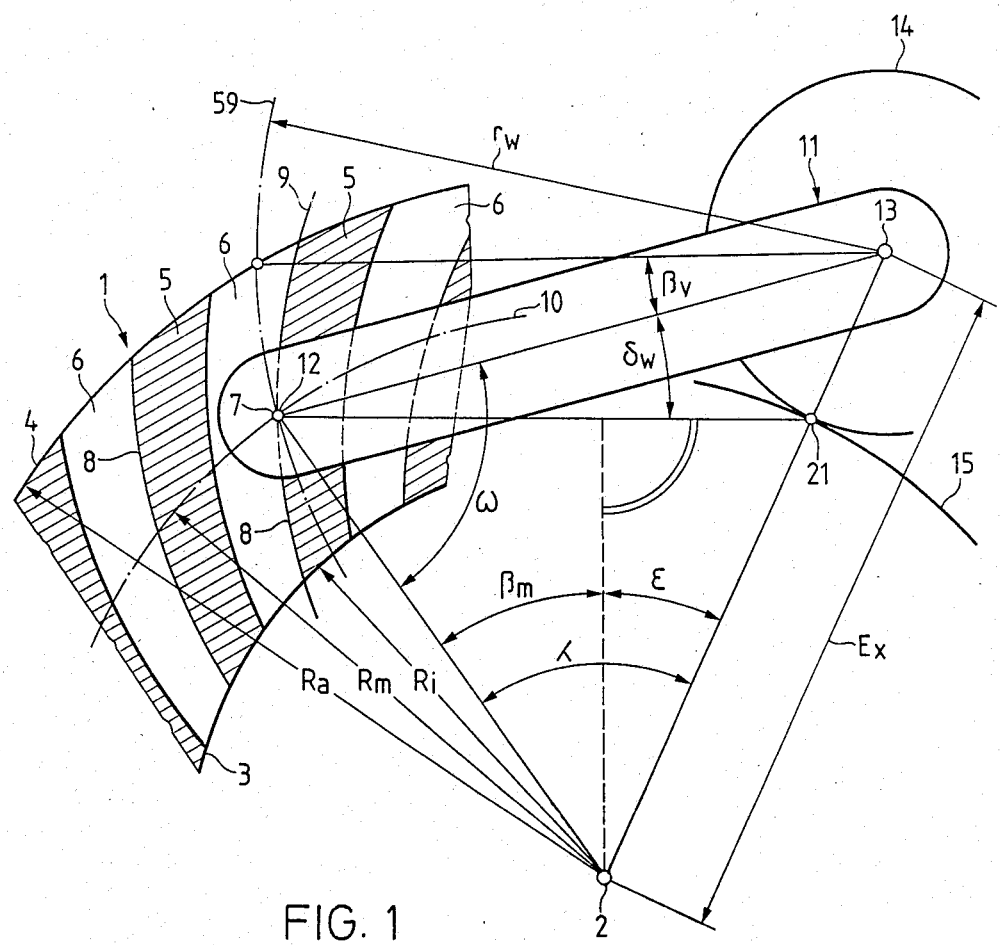
FIG. 1 is a schematic illustration of the geometric conditions prevailing in the gear cutting method according to the invention using the face cutter head according to the invention.

Describing now the drawings, it is to be understood that in order to simplify the illustration thereof only enough of the face cutter head or face-mill gear cutter has been shown as needed for those skilled in the art to readily understand the underlying principles and concepts of the invention. Turning now specifically to FIG. 1, such constitutes a simplified illustration of the most important elements or parts needed for carrying out the method according to the invention as well as indicating part of the most important magnitudes which are required for calculation of the method according to the invention. A crown or face gear, i.e. a contrate gear, is designated by reference numeral 1. Only part of the crown gear 1 will be evident in the showing of FIG. 1. The crown gear 1 meshes in a manner known as such with a bevel gear or pinion to be cut which has not been shown. The center of the cone of the bevel gear coincides with the axis 2 of the crown gear 1. In radial direction the crown gear 1 is defined or limited by the circles 3 and 4. The plane of the drawing of FIG. 1 corresponds to the pitch plane of the crown gear 1 so that the teeth 5 will be recognized in section and the tooth gaps or spaces 6 in a top plan view.

For adjustment of the gear cutting machine reference is made to a computation or calculation point 7. FIG. 1 is intended to show, for example, the geometric conditions prevailing during cutting the outer flanks 8 of the teeth 5. Therefore, the computation point 7 is located on an outer tooth flank 8 or, more precisely, on a longitudinal line 9 of a tooth which appears where the outer flank 8 intersects the pitch plane of the crown gear 1. Preferably the computation point 7 is selected so as to be located in a central plane of the crown gear 1 which, in this case, is represented by a median or central line 10. A face cutter head or face-mill gear cutter is shown schematically in FIG. 1 by an arm 11. The arm 11 carries a cutter or cutter blade (not shown) of which only the pitch point 12 of an inner cutting edge is illustrated. For the calculation and for the representation of the geometric conditions the pitch point 12 coincides with the computation point 7. During cutting the arm 11 or, respectively, the face cutter head, rotates about a rotational axis 13. Since this is a continuous cutting process, the arm 11 rolls with a small generating circle or epicycle 14 on a large generating circle or base circle 15. Thus, the pitch point 12 at the inner cutting edge describes a cycloid-shaped path corresponding to the longitudinal tooth line 9. The angles, radii and distances further evident from FIG. 1 will be referred to hereinafter when the method of calculation is further described and illustrated.

In FIG. 2, again part of the crown gear 1 will be recognized which may be rotated about the crown gear axis 2 and which is represented in this case only by the circles 3 and 4 and the center or median line 10. Again, the computation point 7 will be recognized which coincides with the pitch point 12 of a cutter or cutter blade 16. The cutter 16 appears in the drawing in section in the pitch plane of the crown gear 1 which coincides with the plane of the drawing. Furthermore, the cutter 16 is shown as seen from the side at 17 when folded out or flipped-over. Also, the cutting edge 18 thereof will be recognized, which cutting edge is assumed for the present considerations to lie in a plane which is normal to the plane of the drawing. Therefore, the cutting edge 18 appears as a projection 181 in the plane of the drawing. In reality, a useful cutting edge would appear as a projection 182 or 183 in the plane of the drawing. In comparison to the projection 182 the projection 181 thus has a pressure angle or angle of attack of $\alpha = 0°$, and thus, will generate vertically or radially extending tooth flanks. This assumption, however, has only been made for simplicity of illustration. In case that the cutting edges have a conventional pressure angle $\alpha$ (which will also be evident from the projection), the projection 182, 183 of the respective cutting edges will become apparent at an acute angle $\rho$ or $\rho'$ respectively, which is inclined with respect to an orientation line 22. In this illustration, also, the small generating circle 14 and the large generating circle 15 as well as the rotational axis 13 of the face cutter head will be evident. To show a section of a cycloid 20 which is as large as possible, the cutter 16 is shown in two further positions 161 and 162. The cutting direction is indicated by an arrow 65. As such, only the section of the cycloid 20 intermediate the circles 3 and 4 will be significant for the present discussion. However, certain effects can be shown better, if the cycloid is considered between the circles 321 and 322. Corresponding to the positions of the cutter 16 the rotational axis 13, too, will assume further positions 131 and 132, respectively, while the small generating circle 14 rolls along the large generating circle 15. The distance between the rotational axis 13 and the pitch point 12 of the cutter 16 is denoted as the cutter radius $r_w$. The connection between the pitch point 12 and a contact point 21 of the two generating circles 14 and 15 is denoted as the orientation line 22. The orientation line 22 is inclined by an orientation angle $\delta_w$ towards the cutter radius $r_w$ and determines the orientation of the cutting or rake surface 19 of the cutter 16 in the end cutter head. The cutting surface 19 may deviate from this position if a cutting or rake angle is intended having a value larger than 0°. Further contact points 211 and 212 correspond to the positions 161 and 162, respectively, of the cutter 16. To these correspond further orientation lines 221 and 222, respectively.

A tangent 23 to the cycloid 20 extends normally to the orientation line 22 at the computation point 7. In the position 161 of the cutter 16 a tangent 231 to the cycloid 20 extends normally to a connecting line 24 which connects the contact point 211 to the pitch 121 of the cutter 16 in the position 161. This connecting line 24, however, is only inclined by an angle $\delta_{wi}$ to the cutter radius $r_w$. In the same way, a tangent 232 to the cycloid 20 in the position 162 of the cutter 16 extends normally to a connecting line 25 between the contact point 212 and the reference point 122. This connecting line 25 is inclined by an angle $\delta_{wA}$ towards the cutter radius $r_w$.

Figure 3:
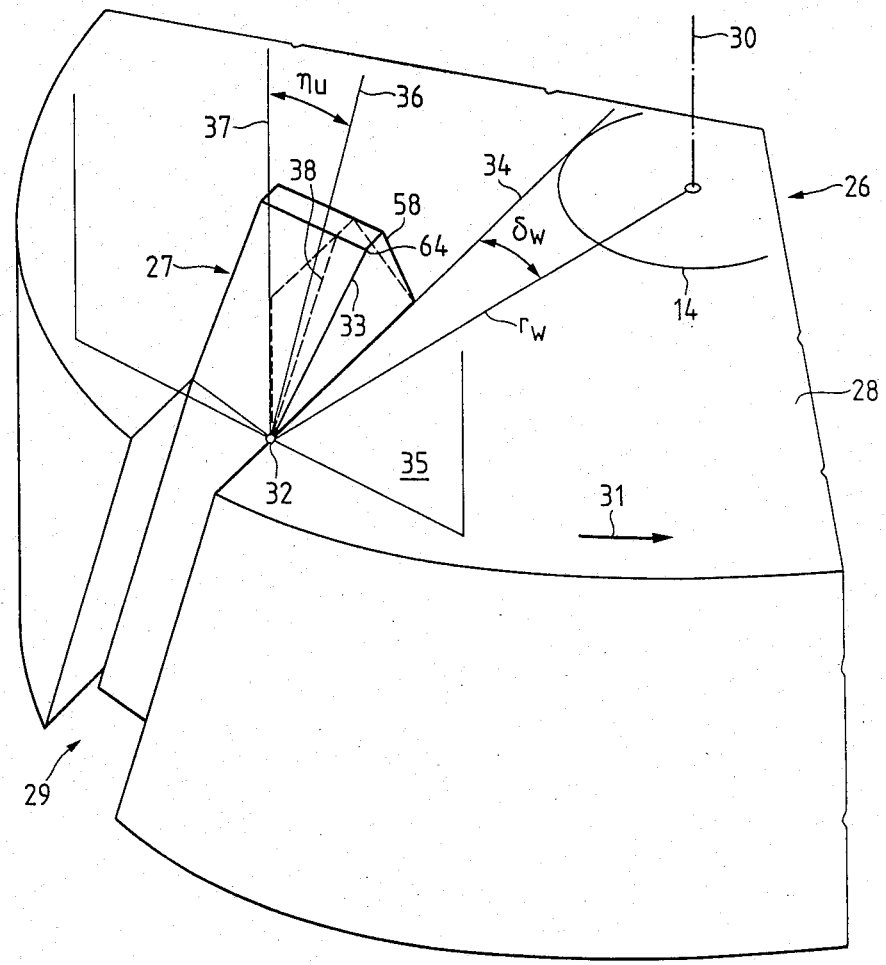
FIG. 3 shows in perspective view part of an face cutter head or face-mill gear cutter according to the invention.

FIG. 3 shows part of an face cutter head or face-mill gear cutter 26 into which, for better clarity, only a single cutter 27 and, as compared to the face cutter head diameter, having an exaggerated size, is inserted. The cutter 27 protrudes from an end face 28 of the face cutter head 26 and is mounted in conventional manner in a slot 29. The face cutter head 26 may be rotated about a rotational axis 30. Rotation is in the direction of the arraow 31. A selected point at the outer cutting edge 33 of the cutter 27 is designated by reference numeral 32. This point, however, may be selected at any random location along the outer cutting edge 33. For better clarity that point has now been selected so as to be located at the end face 28 of the face cutter head 26. A cutter radius $r_w$ as well as an orientation line 34 inclined thereto by an orientation angle $\delta_w$ are located in the end face 28 and intersect at the point 32. A normal plane 35 extends through the point 32 and perpendicularly with respect to the orientation line 34. In a projection onto the normal plane 35 the outer cutting edge 33 appears as a projection 36 which is shown to be extended upwardly somewhat. A line extending normally with respect to the end face 28 and through the point 32 is designated by reference numeral 37. The corresponding projection of an outer cutting edge 38 arranged in a manner as known heretofore will be located on this line. It will be seen that the projection 36 is inclined with respect to the line 37 by an undercut angle $\eta_u$. Thus, the end 64 of the cutting edge 33 leads the point 32. It will be understood that the geometric relations as described hereinbefore will also be valid when the point 32 at the outer cutting edge 33 is selected at a different location along the outer cutting edge 33. Since normally a number of cutters 27 are arranged at one face cutter head 26, an imaginary plane containing the mutually corresponding pitch points of all outer cutting edges will replace, in such case, the end face 28. An inner cutting edge 58 may also be arranged in the same way at an inclination by an undercut angle $\eta_u$.

Figure 4:
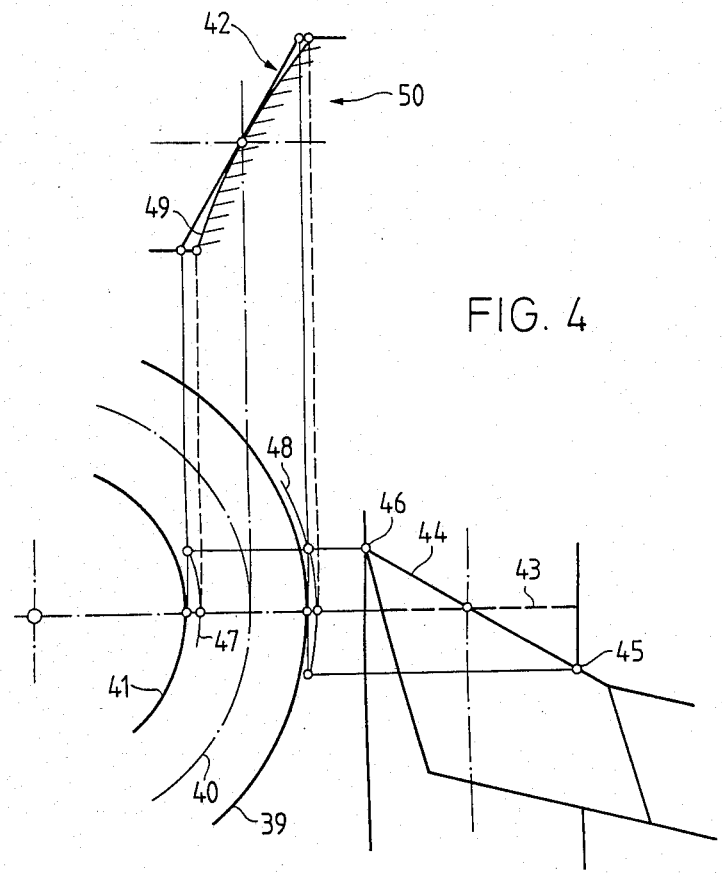
FIG. 4 is a further illustration of the geometric conditions as shown in FIG. 1.

In FIG. 4 the cycloidal tip or addendum flank line 39, the cycloidal pitch circle flank line 40 and the cycloidal root flank line 41 of a tooth flank 42 are indicated. Such cycloidal flank lines correspond to the circles or cycloids cut by cutting edges 33 arranged in the known manner. When the cutting edge is inclined like the cutting edge 44, the tip points 45 and the root points 46 of the cutting edge 44 will describe different circular or cycloidal arcs 47 and 48, respectively. Thus, a curved tooth depth line 49, as shown exaggerated in the drawing, will result as will be evident from the folded-over representation 50. It will be recognized that the end of the cutting edge 44 which is associated with the tooth base, i.e. the root point 46, leads the tip point 45.

Figure 5:
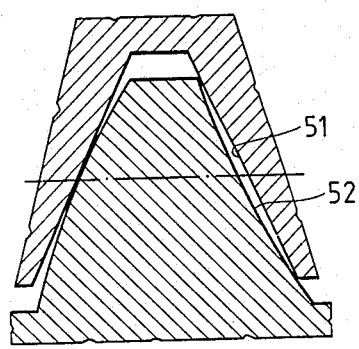
FIGS. 5 and 6 show different tooth depth profiles.

FIG. 5 shows the tooth depth profile 51 of a gear manufactured at an undercut angle of $\eta_u = 0°$. A tooth depth profile 52, however, has been produced with a positive undercut angle.

Figure 6:
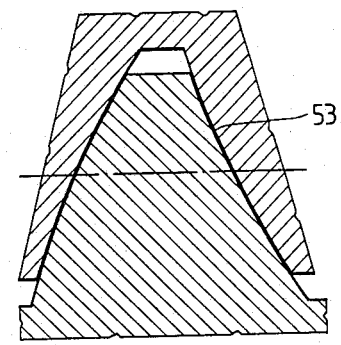

From FIG. 6 two tooth depth profiles of two gears will be evident which have been produced using the same positive undercut angle.

Figure 7:
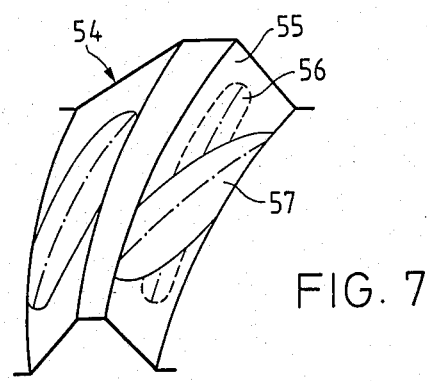
FIG. 7 shows different tooth bearing patterns occurring at a tooth.

In FIG. 7 a tooth 54 will be recognized which shows an optimum tooth bearing pattern or localized tooth contact 56 at the inner flank 55 thereof. By cutting teeth at a positive undercut angle $\eta_u$ a less favorable tooth bearing pattern 57 can be transformed into a more favorable tooth bearing pattern 56.

The mode of operation of the invention will now be further explained and is as follows:

For carrying out the method, a cutter 27 or a number thereof are inserted into a face cutter head 26 in such a manner that the outer and/or inner cutting edges 33, 58 thereof are arranged at an undercut angle $\eta_u$ towards a perpendicular line 37. Then, the face cutter head 26 is chucked to a gear cutting machine which is known as such and therefore not described here in any further detail. Between the face cutter head 26 and a gear blank or an imaginary crown gear 1 to be imagined in place of the latter the following procedures occur as described hereinafter.

Figure 2:
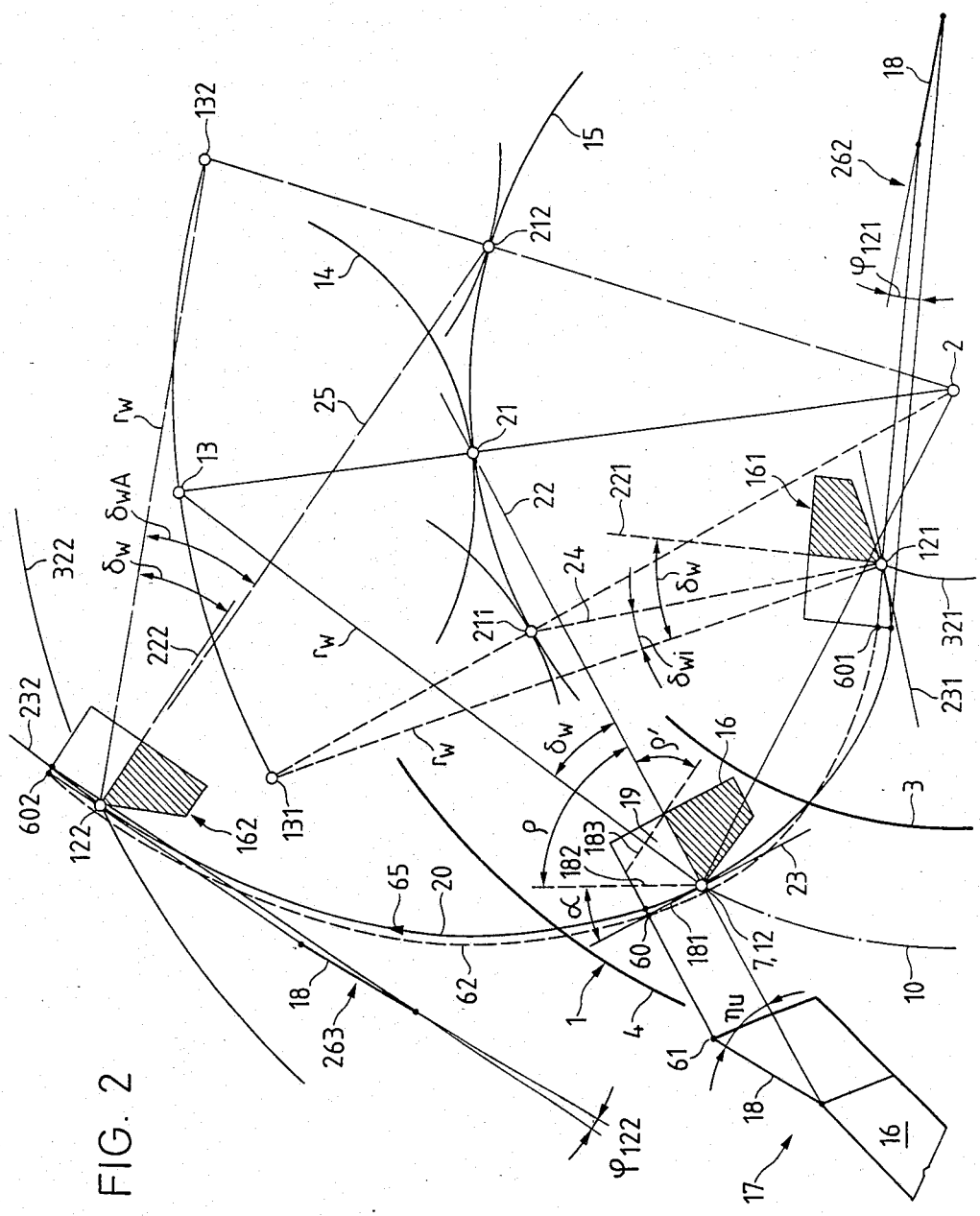
FIG. 2 is a more extended representation of the illustration shown in FIG. 1.

The cutter 27 or, respectively, for example a pitch point 12 rotates with respect to the rotational axis 13 (FIG. 1) or 30 (FIG. 3) of face end cutter head 26 on a circle or arc 59 having the cutter radius $r_w$ (see FIG. 1). The crown gear 1 also rotates, but about the crown gear axis 2. The crown gear 1 and the face cutter head 26 or, respectively, the arm 11 rotate relative to each other in the ratio of the radii of the respective generating or rolling circles 15 and 14, respectively. If one assumes the position of an observer on the crown gear 1 or, in a manner which is equivalent thereto, if the generating circle 14 rolls along the generating circle 15 of the crown gear 1 with the latter stationary, then the pitch point 12 of a cutter will describe a cycloid 20 (FIG. 2). Thus, longitudinal tooth lines 9 are generated which are curved in the shape of a cycloid. When a face cutter head is used for that purpose, the outer cutting edges of which are inclined at an undercut angle $\eta_u$ and the pressure angle or angle of attack of which is $\alpha = 0$, then the root point 61 of the cutting edge 18 will appear in projection in the plane of the drawing, which also is the plane of the cycloid 20, as the point 60 in FIG. 2. In the positions 161 and 162 of the cutter 16 the root point 61 again appears as points 601 and 602, respectively. The points 601 and 602, however, no longer lie on the corresponding tangents 231 and 232, respectively, to the cycloid 20 which was the case for point 60. This means that during its travel along the cycloid 20 the cutter 16 changes its position relative to the cycloid 20 by an amount in the range of $\delta_w - \delta_{wi}$ to $\delta_{wA} - \delta_w$. It can be readily imagined that the root point 61 of the cutting edge 18 describes a cycloid 62 which intersects the cycloid 20 of another point on the cutting edge 18 since the cycloid 62 extends from the point 601 through the point 60 to the point 602.

The folded-over positions 262 and 263 of the cutting edge 18 about the orientation line 221 and 222, respectively, indicate the twist of the tooth flank at the pitch point 121 and 122, respectively. Thus, the twisting angles $\rho_{121}$, $\rho_{122}$ at this location will also be recognized.

In addition to the twisting the tooth flanks are also slightly curved as shown in FIG. 4. This is so because the cutting edge now no longer extends exclusively in a radial plane like the cutting edge 43. Starting from desired twist or twisting angles $\rho_A$ and $\rho_i$ or from the entire twisting angle $\rho$ the undercut angle $\eta_u$ can be calculated following the method of calculation as given hereinbelow. Therefor other starting data will have to be known such as:

The number of teeth $z_w$ of the tool. This is understood as the number of groups of cutters or cutter blades (outer and inner cutters) contained in the face cutter head. The normal module $m_n$. The cutter radius $r_w$. The spiral or helix angle $\beta_m$ as well as the mean radius $R_m$ of the crown gear. The width b of the crown gear follows from the difference of the radii $R_A$ and $R_i$.

Initially the orientation angle $\delta_w$ is calculated from the equation I:

$$\sin \delta_w = \frac{z_w \cdot m_n}{2 \cdot r_w} \quad \text{(I)}$$

The angle $\omega$, then, is known from equation II:

$$\omega = 90° - \beta_m + \delta_w \quad \text{(II)}$$

The sum of the two generating or rolling circle radii $E_x$ will follow from equations III, IV and V:

$$E_x = \sqrt{R_m^2 + r_w^2 - 2R_m r_w \cdot \cos \omega} \qquad \text{(III)}$$

$$\cos \lambda = \frac{R_m^2 + E_x^2 - r_w^2}{2 \cdot R_m \cdot E_x} \qquad \text{(IV)}$$

$$\epsilon = \lambda - \beta_m \qquad \text{(V)}$$

Due to the values obtained from equations IV and V the angle $\beta_r$ can be calculated from equation VI:

$$\sin \beta_r = \frac{b}{2r_w \cos(\beta_m - \delta_w)} \qquad \text{(VI)}$$

The two orientation angles of the tangents to the cycloid at the end points of a longitudinal tooth line will result from equations VII and VIII:

$$\sin \delta_{wA} = \frac{\sin \delta_w \cdot \cos(\epsilon - \beta_r)}{\cos \epsilon} \qquad \text{(VII)}$$

$$\sin \delta_{wi} = \frac{\sin \delta_w \cdot \cos(\epsilon + \beta_r)}{\cos \epsilon} \qquad \text{(VIII)}$$

The undercut angle $\eta_{uA}$ for the outer regions or sections of the crown gear, $\eta_{ui}$ for the inner regions or sections of the crown gear as well as $\eta_u$ for the total twist thus amount to:

$$tg\ \eta_{uA} = \frac{tg\ A \cdot \cos \beta_m}{\sin(\delta_{wA} - \delta_w)} \qquad \text{(IX)}$$

$$tg\ \eta_{ui} = \frac{tg\ i \cdot \cos \beta_m}{\sin(\delta_w - \delta_{wi})} \qquad \text{(X)}$$

$$tg\ \eta_u = \frac{tg \cdot \cos \beta_m}{\sin(\delta_w - \delta_{wi}) + \sin(\delta_{wA} - \delta_w)} \qquad \text{(IX)}$$

While there are shown and described present preferred embodiments of the invention, it is to be distinctly understood that the invention is not limited thereto, but may be otherwise variously embodied and practiced within the scope of the following claims. ACCORDINGLY,

What I claim is:

1. A face cutter head for configuring the tooth bearing pattern of gears containing teeth having an arcuate cycloid shape and moving in a predetermined direction during a continuous gear teeth cutting operation, comprising:
   a predetermined number of cutters arranged in said face cutter head;
   each cutter of said predetermined number of cutters defining at least one predetermined cutting edge;
   a cutter radius;
   an orientation line;
   said orientation line and said cutter radius defining a plane which is essentially parallel to an end face of said face cutter head;
   a normal plane extending essentially perpendicular to said orientation line;
   said orientation line intersecting said cutter radius in said normal plane and being inclined with respect to said cutter radius by a predetermined orientation angle;
   each of said cutters defining a rake surface thereof;
   said orientation line lying within said rake surface irrespective of a possible rake angle defined between said rake surface and said normal plane; and
   a projection of a selected one of an inner cutting edge and an outer cutting edge defined by said at least one predetermined cutting edge into said normal plane appearing inclined by an undercut angle with respect to a line extending normally with respect to said plane which is parallel to said end face of said face cutter head such that an end of said at least one predetermined cutting edge remote from said end face leads as viewed in the direction of movement of said face cutter head for configuring the tooth bearing pattern by an effective twisting of a longitudinal tooth flank line and an effective curvature of a tooth flank.

2. The face cutter head as defined in claim 1, wherein:
   said undercut angle, as viewed in said direction of movement of said face cutter head, assumes positive values.

3. The face cutter head as defined in claim 1, wherein:
   said undercut angle has the same value with respect to said inner cutting edge and said outer cutting edge.

4. The face cutter head as defined in claim 1, further including:
   two face cutter heads for manufacturing meshing tooth flanks at two gears of a pair of gears; and
   said undercut angle having the same value for said at least one predetermined cutting edges at both said gears of said pair of gears.

5. The face cutter head as defined in claim 1, wherein:
   said predetermined orientation angle exceeds 15°.

6. A face-cutting cutter head for a gear-cutting machine operating on the continuous generation principle wherein the cutter head performs rotation about a first axis and generating motion about a second axis for cutting gear teeth having a cycloidally arcuate tooth shape and thereby determining a tooth contact pattern of the gear teeth, comprising:
   a cutter head body;
   said cutter head body having a periphery and an end face extending substantially perpendicular to said first and second axes;
   at least one cutter blade for said cutter head body;
   said at least one cutter blade having a cutting surface;
   the generating motion describing a base circle and an epicycle rolling upon said base circle at an instantaneous contact point;
   said cutting surfaces containing a first cutting point located such that a radial line connecting said cutting point with the first axis defines conjointly with an orientation line connecting said first cutting point with said instantaneous contact point a plane extending substantially parallel to said end face;
   said cutter head body being provided with a respective slot for each said at least one cutter blade;
   each said respective slot being fashioned in said cutter head body such that said cutting surface of said at least one cutter blade extends substantially coincident with said orientation line;
   the rotation and the generating motion conjointly defining a cycloidal motion of said first cutting point substantially coinciding with said cycloidally arcuate tooth shape;
   each said respective slot being fashioned in said cutter head body such that a projection of said cutting surface onto a normal plane extending perpendicular to said orientation line at said first cutting point extends at an undercut angle relative to an intersection line of said normal plane with an orientation plane defined by said orientation line and the second axis;

said cutting surface containing a second cutting point more remote from said end face than said first cutting point; and said undercut angle having a sense causing said second cutting point to lead said first cutting point in the direction of said cycloidal motion of said first cutting point.

* * * * *